Figure 1:
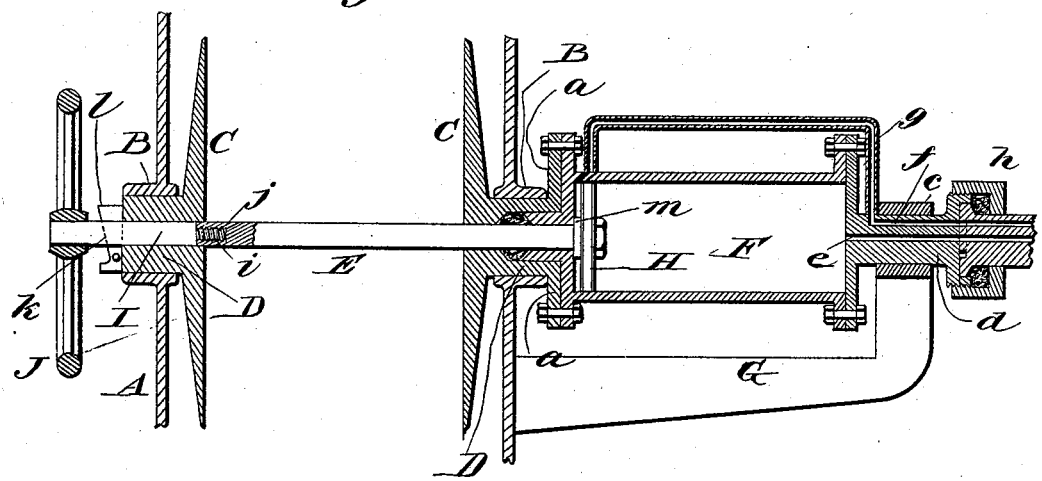

(No Model.)

F. L. DYER.
CORE AND CORE OPERATING MECHANISM FOR COTTON PRESSES.

No. 592,283. Patented Oct. 26, 1897.

Witnesses.

Inventor
Frank L. Dyer

UNITED STATES PATENT OFFICE.

FRANK L. DYER, OF WASHINGTON, DISTRICT OF COLUMBIA, ASSIGNOR TO THE AMERICAN COTTON COMPANY, OF NEW YORK, N. Y.

CORE AND CORE-OPERATING MECHANISM FOR COTTON-PRESSES.

SPECIFICATION forming part of Letters Patent No. 592,283, dated October 26, 1897.

Application filed June 20, 1895. Serial No. 553,670. (No model.)

*To all whom it may concern:*

Be it known that I, FRANK L. DYER, a citizen of the United States, residing at Washington, in the District of Columbia, have invented certain new and useful Improvements in Cores and Core-Operating Mechanism for Cotton-Presses for Making Cylindrical Bales, (Case No. 20;) and I do hereby declare the following to be a full, clear, and exact description of the invention, which will enable others skilled in the art to which it appertains to make and use the same.

My invention relates to improvements in cores and core-operating mechanism for cotton-presses for making cylindrical bales.

The invention can be used in connection with presses employing either belts or rollers for the making of such bales.

After a sufficient amount of cotton has been wound on the core of such presses it is desirable to withdraw the core from the bale, but owing to the density of the cotton and the great pressure to which it has been subjected in the press it becomes very difficult to do this. By means of my improved core mechanism the core can be very easily and quickly withdrawn from the bale.

My improved core is particularly adapted for use with those presses wherein the core constitutes a part of the press and is withdrawn from the bale while in the press, and its advantage is that it is necessary to withdraw the core only for a distance equal approximately to the width of the bale. This advantage arises by reason of the fact that the free end of the core is supported close to the edge of the bale instead of entering a bearing at the side of the machine for from ten to twelve inches or more. When narrow bales of about twenty-four inches in width are made, this advantage is of great importance, as it enables the machine to be made considerably narrower and a much more compact withdrawing device may be employed.

When my improved core is employed with presses wherein the core is removed with the bale and is subsequently withdrawn from the bale, if desired, a very important advantage is obtained of rigidly holding the end flanges of the bale against lateral strains. In all of the presses of this type with which I am familiar the cores have been simply supported in sockets in the end flanges, and lateral strains due to the end bulging of the cotton have been taken up by the frame of the machine. Since the strains are enormous, care has been taken to make the bales considerably narrower than the space between the end flanges, so that said end flanges in such prior machines do not compress and flatten the ends of the bale, but serve simply to prevent the cotton from becoming entangled with the working parts of the machine.

By employing my improved core the end flanges will be practically tied immovably together and the cotton may be wedged in tightly between the same, so as to form smooth ends for the bale.

For a better comprehension of my invention attention is directed to the accompanying drawings, forming a part of this specification, and in which—

Figure 2:
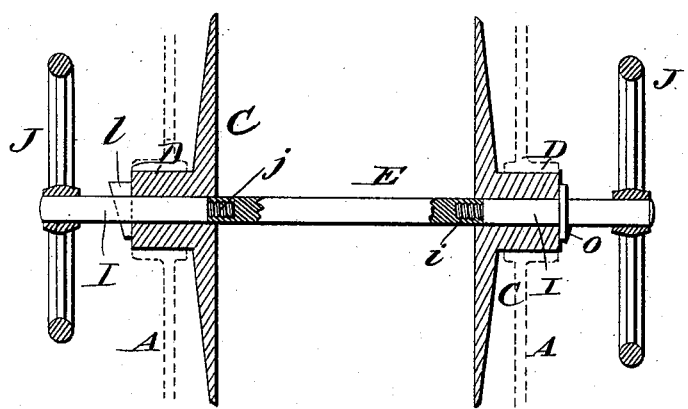
Figure 3:
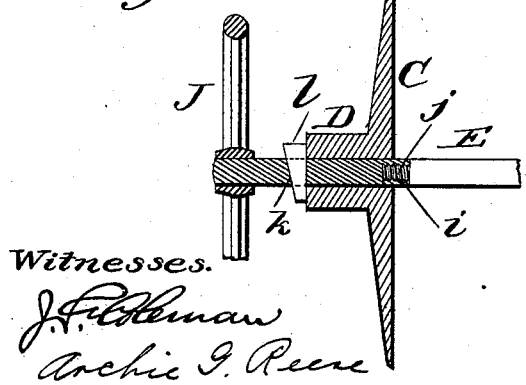

Figure 1 is a sectional view illustrating the preferred construction; Fig. 2, a similar view showing the employment of my improved core in connection with those presses wherein the core is removed from the machine with the bale; Fig. 3, a similar view of a modification, and Fig. 4 a detailed view illustrating an equivalent for the key.

In all of the above views corresponding parts are designated by similar letters of reference.

Referring to Fig. 1, A A represent the main side frames of the machine, formed with heavy bearings B B. C C are the end flanges, having integral sleeves D, which are mounted in the bearings B. The end flanges C are preferably of approximately the diameter of the completed bale.

E is the core, made, preferably, of a solid steel bar, which is perfectly smooth and preferably is kept oiled, so that it may be more easily withdrawn from the bale. This core is mounted between the end flanges C C, and the bale is formed thereon in the usual way.

The sleeve D of the end flange C at the right-hand side of the machine (shown in Fig. 1) is made hollow, as illustrated, and is provided with a flange $a$ at the outside of the machine.

F is a steam-cylinder bolted to the flange $a$, so as to revolve with the end flanges. The stuffing-box $b$ of this cylinder is mounted within the hollow sleeve D, as shown.

G represents a heavy supporting-arm secured to one of the side frames and formed with a bearing $c$ at its outer end.

The cylinder F is provided with an integral bearing-piece $d$, formed on the outer cylinder-head which bears in the bearing $c$, and by reason of which the cylinder F will be always kept in proper alinement.

The bearing-piece $d$ is provided with steam-passages $e$ and $f$ therein, the former passage opening into the rear of the cylinder F and the latter passage being connected with a steam-pipe $g$, which opens into the forward end of said cylinder. A steam-coupling $h$ connects the bearing-piece $d$ with a source of steam-supply, and a valve-chest (not shown) controls the supply of steam to the different ports.

H is a piston mounted in the steam-cylinder F, which piston connects directly with the end of the core E. The other end of the core E enters a short socket formed in the end flange at the left of the machine, and said core is provided with a screw-threaded chamber $i$ in its outer end.

I represents a steel shaft mounted in the solid sleeve D and provided with a screw-threaded projection $j$, which engages with the end of the core E, as will be understood. The shaft I at the end of the solid sleeve D is provided with a keyway $k$ therein, in which keyway an ordinary key $l$ is adapted to be driven, so as to bind the parts tightly together.

J represents a hand-wheel on the free end of the shaft I for operating the same, but it should be understood that said shaft may be operated in any other way. Near the other end of the core E a collar $m$ is formed, which when the key $l$ is driven in place is drawn tightly against the front of the cylinder F. In this way the end flanges C C will be tied rigidly together, and cotton as it is wound in place on the core E may be wedged in tightly between said flanges, so as to form smooth ends for the bale.

The parts illustrated in Fig. 1 are ready for the commencement of a bale, and after the bale has been formed the operation of the device shown in this figure is as follows: The key $l$ is first loosened or driven entirely out of the keyway $k$ by a sharp blow from a hammer or other implement and the strain is taken off of the flanges, which will be allowed to separate slightly under the expansion of the cotton, sufficient play in the bearings B being allowed for this purpose. The hand-wheel J is now operated so as to disengage the screw-threaded projection $j$ from the end of the core and steam is allowed to enter the front of the cylinder through the pipe $g$ in front of the piston H and forces said piston through the length of the cylinder, so as to withdraw the core E from the bale. It will be observed that during this operation the tendency of the core in being withdrawn will be to force the bale against the end flange C at the right-hand side of the machine and that no strain whatever will be imposed upon the frame of the press. I consider this a very important point, because if, for example, the steam-cylinder F was mounted on the frame A the strain imposed in withdrawing the core would have to be taken up by said frame, which would therefore have to be made much stronger than would otherwise be the case. After the core has been withdrawn from the bale the bale is ejected from the machine, whereupon steam is allowed to enter the passage $e$ at the end of the piston, and said piston is forced to its original position, so as to return the core. When this is done, the hand-wheel J is operated so as to engage the shaft I again with the core, after which the key $l$ is driven in place and the parts are ready for the formation of a new bale.

In connection with the steam-cylinder F it is to be observed that suitable provision is to be made for the proper manipulation of the piston H, appropriate valve mechanism being provided to arrest the movements of said piston when it reaches its limits of movement.

It will be of course understood that instead of employing steam for the operation of the piston H it is possible to actuate the same by compressed air, water, &c.

Figure 4:
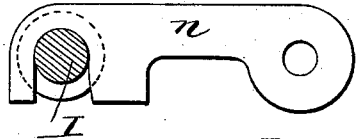

Instead of forming a screw-threaded passage in the end of the core, as explained, the said core may be provided with a screw-threaded projection thereon which engages within the shaft I, as shown in Fig. 3, and instead of employing a key $l$ it is possible to make use of a latch $n$, pivoted to the solid sleeve D and engaging with an annular recess formed in the shaft I, as shown in Fig. 4.

The employment of a key $l$ or its equivalent, as I have explained, is of the utmost importance, because if it were attempted to disengage the shaft I from the end of the core while subjected to the great strain produced by the expansion of the cotton the screw-threads between the two parts would be quickly worn out and destroyed, but by employing such a key or its equivalent the strain on these parts is removed before they are separated.

In Fig. 2 I illustrate the employment of my improved core in connection with a press wherein the core is adapted to be removed from the press with the bale. In this figure the end flanges C, having bearing-sleeves D mounted in bearings B in the side frames A of the machine, are shown. The core E is adapted to be engaged at each end with a shaft I, mounted in the sleeves D, as before explained. Both of said shafts are operated by hand-wheels J or in any other suitable way. In this figure I show one of these shafts I provided with a sleeve $o$, which bears against the bearing-sleeve D at the right-hand side of the machine, and illustrate a key $l$ for the other shaft. It is to be understood, however, that a key may be employed for both shafts. With this construction of press after the bale has been formed the key *l* is removed from the shaft I, so as to take off the strains. Both the parts and the shafts I are then operated so as to disengage the ends of the core. The bale is then removed from the machine, and the core E may be withdrawn from the bale in any suitable way.

I am not the first inventor of the combination, in a press for making cylindrical cotton-bales, of the machine-frame, with flanges having hollow central lugs mounted in said frame, with a core extending between said flanges, and with a rod mounted in one of said hollow central lugs and connected by screw-threads with the adjacent end of said core.

Having now described my invention, what I claim as new, and desire to secure by Letters Patent, is as follows:

1. In a press for making cylindrical cotton-bales, the combination with end flanges, of a core mounted between said end flanges, a separate shaft in one of said end flanges, there being a detachable connection between said shaft and the end of the core, and a key for said shaft, substantially as set forth.

2. In a press for making cylindrical cotton-bales, the combination with end flanges, of a core mounted between said end flanges, a separate shaft in one of said end flanges, there being a screw-threaded connection between said shaft and the end of the core, and a key for said shaft, substantially as set forth.

3. In a press for making cylindrical cotton-bales, the combination with end flanges, of a core mounted between said end flanges, a separate shaft in one of said end flanges, there being a screw-threaded connection between said shaft and the end of the core, a key for said shaft, and a hand-wheel on said shaft for operating the same, substantially as set forth.

4. In a press for making cylindrical cotton-bales, the combination with end flanges formed with bearing-sleeves thereon, of a core mounted between said end flanges, a separate shaft mounted in one of said bearing-sleeves, there being a screw-threaded connection between said shaft and the end of the core, and a key for said shaft engaging against the outer end of said bearing-sleeves, substantially as set forth.

5. In a press for making cylindrical cotton-bales, the combination of a core on which the bale is formed, a cylinder carried by the press, and a piston within said cylinder and to which the core is permanently attached, substantially as set forth.

6. In a press for making cylindrical cotton-bales, the combination of a revoluble core on which the bale is formed, a cylinder carried by the press and revolving with the core, and a piston within said cylinder, and to which the core is permanently attached, substantially as set forth.

7. In a press for making cylindrical cotton-bales, the combination of an end flange against which the bale is formed, a cylinder mounted upon and rotating with the same, a piston in said cylinder, and a core extending through said end flange and connected with said piston, substantially as set forth.

8. In a press for making cylindrical cotton-bales, the combination of the frame of the machine formed with a bearing B therein, a sleeve D mounted in said bearing, there being an end flange C at one end of said sleeve, a cylinder F mounted on the other end of said sleeve, a piston H in said cylinder, and a core E mounted in said sleeve and connected to said piston H, substantially as set forth.

9. In a press for making cylindrical cotton-bales, the combination of the frame of the machine formed with a bearing B therein, a sleeve D mounted in said bearing, there being an end flange C at one end of said sleeve, a cylinder F mounted on the other end of said sleeve, a piston H in said cylinder, a core E mounted in said sleeve and connected to said piston H, and a bracket-arm G carried by the main frame and supporting the outer end of the cylinder, substantially as set forth.

10. In a press for making cylindrical cotton-bales, the combination of two end flanges, a core mounted between the same, means for detachably securing one end of the core, and a steam-cylinder and piston connected with the other end of the core for withdrawing the same from the bale, substantially as set forth.

In testimony whereof I affix my signature in presence of two witnesses.

FRANK L. DYER.

Witnesses:
PHILIP F. LARNER,
L. DELLA McGIRR.